United States Patent
Gruenewald et al.

(10) Patent No.: US 8,365,191 B2
(45) Date of Patent: Jan. 29, 2013

(54) CONTAINER FOR DISPARATE SOFTWARE COMPONENTS

(75) Inventors: Thomas Gruenewald, Somerset, NJ (US); Hartmut Ludwig, West Windsor, NJ (US); Georg Muenzel, Plainsboro, NJ (US)

(73) Assignee: Siemens Corporation, Iselin, NJ (US)

( * ) Notice: Subject to any disclaimer, the term of this patent is extended or adjusted under 35 U.S.C. 154(b) by 1170 days.

(21) Appl. No.: 12/211,319

(22) Filed: Sep. 16, 2008

(65) Prior Publication Data

US 2009/0094617 A1   Apr. 9, 2009

Related U.S. Application Data

(60) Provisional application No. 60/976,812, filed on Oct. 2, 2007.

(51) Int. Cl.
G06F 9/44 (2006.01)
G06F 9/54 (2006.01)

(52) U.S. Cl. .......................... 719/313; 719/315; 719/316

(58) Field of Classification Search .................. None
See application file for complete search history.

(56) References Cited

U.S. PATENT DOCUMENTS

| 6,836,880 B1 | 12/2004 | Dorn et al. |
| 2006/0206862 A1 | 9/2006 | Becker et al. |
| 2010/0037237 A1 * | 2/2010 | Reinart .......................... 719/313 |

OTHER PUBLICATIONS

George T. Eowaros et al., "Integrating publisher/Subscriber Services in Component Middleware for Distributed Realtime and Embedded Systems," ACM Southeast Regional Conference, Apr. 2, 2004-Apr. 3, 2004, pp. 171-176. http://www.cs.wustl.edu/{schmidt/PDF/a__cmse__mdm__ec.pdf. Retrieved on Jan. 15, 2009.

David A. Chapell: "Enterprise Service Bus" Jun. 25, 2004. Retrieved from http://proquest.safaribooksonline.com/0596006756 on Jan. 14, 2009.

European Search Report dated Jan. 28, 2009 cited in corresponding European application No. EP 08165194.

* cited by examiner

Primary Examiner — Qing Wu
(74) Attorney, Agent, or Firm — King & Spalding LLP

(57) ABSTRACT

A computer readable medium embodying instructions executable by a processor to perform a method for hosting components implemented in different computer readable languages within one process. The method includes instantiating a container within a single process, creating a hosting environment for each of a plurality of components, and wherein loading the components by respective environments and wherein the hosting environments are objects instantiated within the container and within the one process, and wherein the plurality of components are implemented in respective a computer readable language, and instantiating a container communication framework object within the container and the one process for processing serialized messages of the components, wherein specific language adapters convert data types of the components to a common implementation, wherein the messages of the plurality of components are processed within the container.

11 Claims, 5 Drawing Sheets

```
<Component name="CounterServiceNET" technology="NET" type
    <Interfaces>
        <Interface name="ICounterServiceFactory"/>
    </Interfaces>
</Component>

<Component name="CounterServiceJAVA" technology="JAVA" type
```

201
202

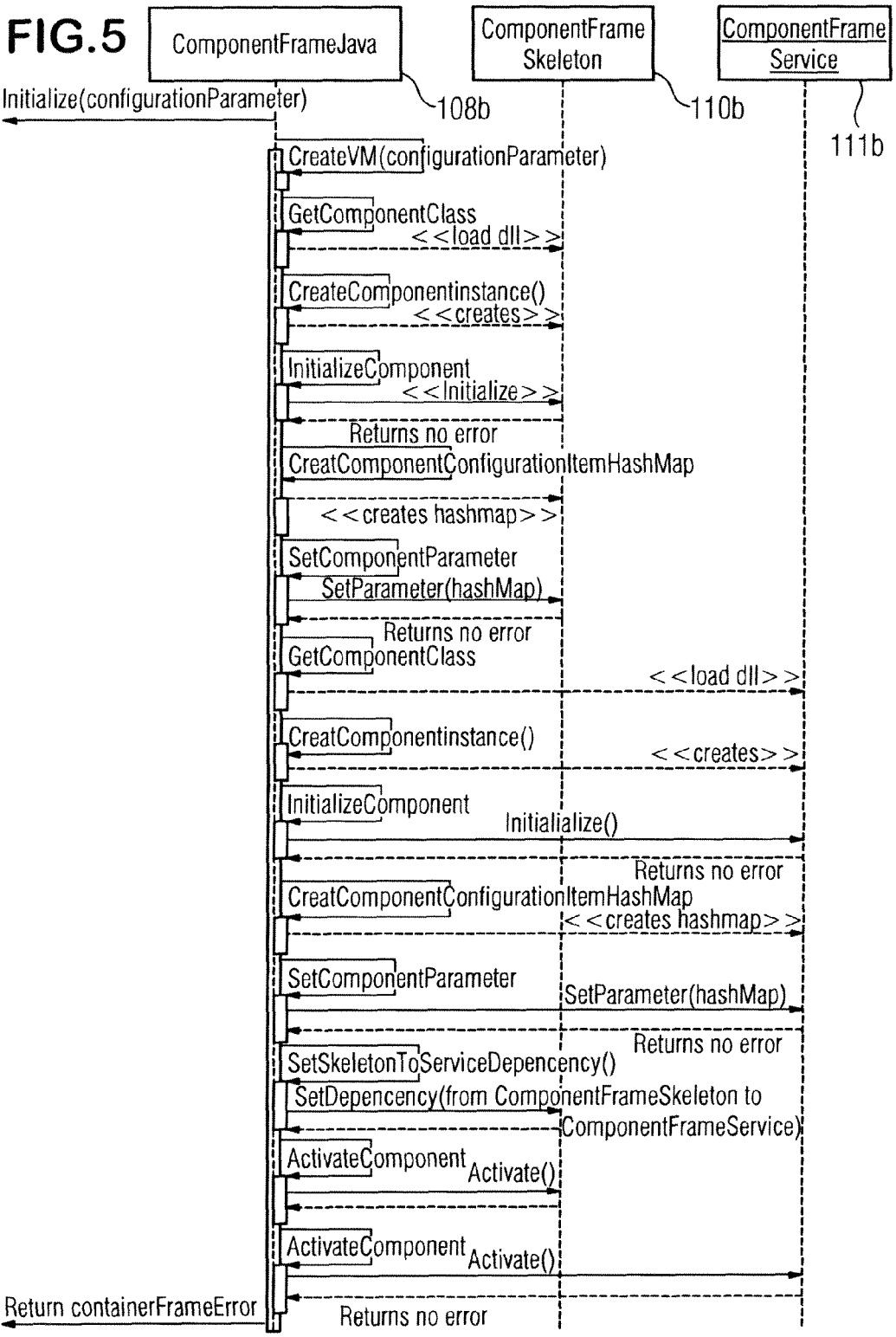

CONTAINER FOR DISPARATE SOFTWARE COMPONENTS

CROSS-REFERENCE TO RELATED APPLICATIONS

This application claims the benefit of Provisional Application No. 60/976,812 filed on Oct. 2, 2007 in the United States Patent and Trademark Office, the contents of which are herein incorporated by reference in its entirety.

BACKGROUND OF THE INVENTION

1. Technical Field

The present disclosure relates to software frameworks, and more particularly to a system and method for enabling software components implemented in different technologies running within one process.

2. Description of Related Art

A container is a runtime entity that provides services to specialized components, e.g. lifecycle management, dependency management and configuration. The container is an application that can host components and provides special services to this components.

Containers are technology specific, for example, written for Java, .NET, etc. For example, an OSGi (Java) container, specified by the OSGi Alliance (formerly known as the Open Services Gateway initiative), is a Java-based service platform that can be remotely managed. The OSGi specification is a framework that defines an application lifecycle model and a service registry. The OSGi container natively supports loading and hosting of Java components but has no support for other technologies.

In a Java Framework implementation, the Java SDK allows hosting C++ components (DLLs) in a Java Virtual Machine (JVM) process. A java function call loads this DLL via the Java Native Interface (JNI), the components of which can be activated and interact with each other. The Java Framework allows only C++ DLLs to be loaded.

Referring to the .NET Framework; The .NET Framework has a function call that loads a C++ component into the .NET virtual machine process. Via PInvoke the two components can interact with each other. The .Net Framework from Microsoft supports only the loading of C++ DLLs.

In each of these technologies, OSGi, Java, and .Net, loading and hosting of different technologies in a single process is not supported.

While communication between processes is possible, it introduces inefficiencies and additional resource overhead. For example, for components hosted in separate application processes, inter-process communication uses, for example, sockets, remote procedure calls (RPC), etc.

Therefore, a need exists for a system and method for enabling software components implemented in different technologies to be hosted in a container implemented as a single process.

SUMMARY OF THE INVENTION

According to an embodiment of the present disclosure, a computer readable medium is provided embodying instructions executable by a processor to perform a method for hosting components implemented in different computer readable languages within one process. The method includes instantiating a container within a single process, creating a hosting environment for each of a plurality of components, wherein the hosting environments are objects instantiated within the container and within the one process, and wherein the plurality of components are implemented in respective a computer readable language, and instantiating a container communication framework object within the container and the one process for processing serialized messages of the components, wherein specific language adapters convert data types of the components to a common implementation, wherein the messages of the plurality of components are processed within the container.

According to an embodiment of the present disclosure, a method for creating a device for hosting software components implemented in different computer readable languages includes instantiating a container within one process executing on a processor, creating a hosting environment for each computer readable language, wherein the hosting environments are objects instantiated within the container, and wherein each the hosting environment supports at least one software component within the one process, loading the components by respective environments and instantiating the components within the container, and instantiating a container communication framework object within the container for processing serialized messages of the components, wherein specific language adapters convert data types of the components to a common implementation within the container, and wherein the container manages the components through the container communication framework.

According to an embodiment of the present disclosure, a computer readable medium is provided embodying instructions executable by a processor to perform a method for hosting components implemented in different computer readable languages within one process. The method includes instantiating a container within one process, creating a hosting environment for each of a plurality of components, wherein the hosting environments are objects instantiated within the container and within the one process, and wherein the plurality of components are implemented in respective a computer readable language, and instantiating a container communication framework object within the container and the one process for processing messages of the components, wherein language adapters associated with respective hosting environments convert messages of the components to a common implementation for inter-component communication, wherein the conversion of the messages includes serializing the messages passed to the container communication framework object and deserializing replies to the messages received from the container communication framework object.

BRIEF DESCRIPTION OF THE DRAWINGS

Preferred embodiments of the present invention will be described below in more detail, with reference to the accompanying drawings:

FIG. 5 is an exemplary sequence diagram for configuring a component frame, according to an exemplary embodiment of the present disclosure.

DETAILED DESCRIPTION OF PREFERRED EMBODIMENTS

According to an embodiment of the present disclosure, a multi-technology container (herein after "container") implemented as a single process allows for the hosting of software components implemented in different technologies, including C/C++, .Net, Java, etc. According to an embodiment of the present disclosure, a container is technology independent. A separate hosting environment is created for each technology needed by the software components. A container may be implemented in, for example, an environment for migrating software written in different technologies into one process. In other exemplary implementations, a container can be used for Supervisory Management & Control Systems supporting human resource applications implemented in different technologies, Service Oriented Architecture (SOA) for business processes implemented in different technologies, etc. Further, legacy software can be wrapped as component and hosted within one process and used with new components written in different technologies. Different implementations can be written in various technologies using container concept.

Figure 6:
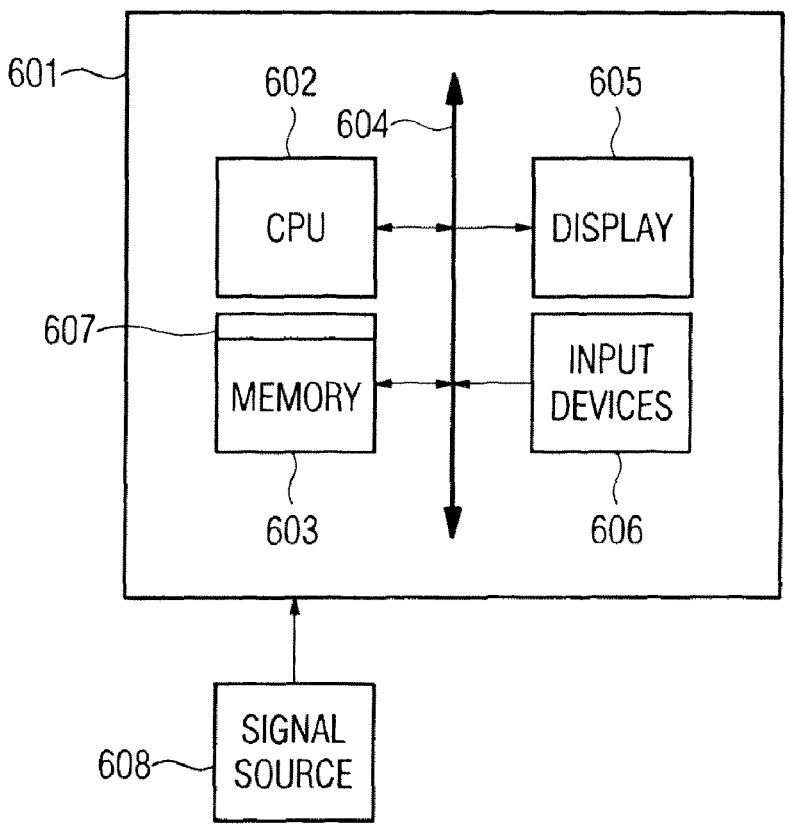
FIG. 6 is a diagram of a computer system for implementing a container according to an exemplary embodiment of the present disclosure.

According to an embodiment of the present disclosure, a process is an instance of a computer program that is being sequentially executed by a processor (see FIG. 6). The process is an execution of the computer program. Different processes may share the same set of instructions in memory. Each execution of the computer program is an instance.

Figure 1:
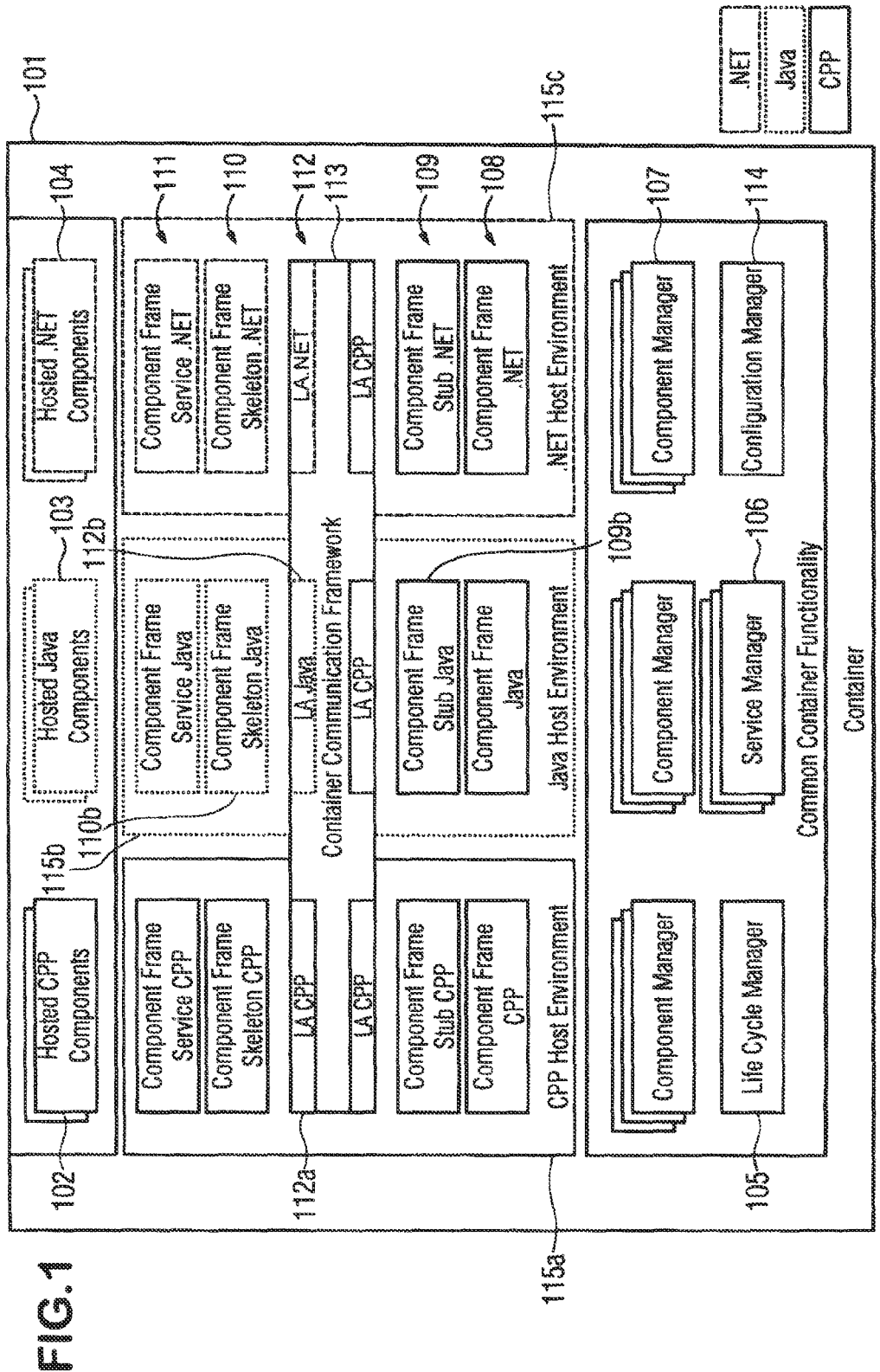
FIG. 1 is a diagram of a container having different hosted components according to an exemplary embodiment of the present disclosure.

FIG. 1 depicts a container 101 for hosting components 102-104 of different technologies. Each block within the container may be an object written in an Object-Oriented programming language. A lifecycle manager 105 maintains a list of services, service components, and shared components offered by the container 101. The lifecycle manager 105 manages the registering/unregistering of services and shared components. It is responsible for maintaining services and shared components available in the current container 101. The lifecycle manager 105 object is created when the container 101 is instantiated.

A service manager 106 associates a list of component managers 107 for a service. A configuration manager 114 determines which component belongs to a service. There is one service manager object 106 for every service.

Each component manager 107 represents and holds all resources for one deployed component. The component manager 107 is responsible for loading/unloading, initializing/uninitializing and activating/deactivating one component. The component manager 107 object contains a component instance configuration for its corresponding deployed component instance (e.g., a component among components 102-104) and the description of the component type. The component instance configuration contains information in which technology a component is written. For every configured component in a container configuration (FIG. 3, 301) one component manager 107 instance is created.

A component frame 108 provides a generic framework to host a component for a specific technology and hides technology specifics from the component manager 107 and service manager 106 and lifecycle manager 105. For example the component frame 108 for Java manages (loads/instantiates/deletes/unloads) a JVM (JavaVirtualMachine) which is the runtime environment needed to execute Java code. Another task of the component frame 108 is to manage a component frame stub 109, a component frame skeleton 110 and a component frame service 111. The component frame 108 is instantiated once per technology (e.g., C++(or CPP), Java, .Net, etc.) during a startup phase of the container 101. There is one object instance 112 for each technology.

The component frame stub 109 serializes API (Application Programming Interface) calls and parameters and uses the component frame 108 to send messages to a service skeleton 110. In general stubs 109 and skeletons 110 define interfaces for applications and services which allow other applications/services to interact with them. The stub 109 and skeleton 110 files are generated automatically in C++, .Net and Java, whereas the definition of such an interface is described with an service interface description language. The generator can be extended to generate stubs and skeletons for other technologies. The stubs are created in the same technology as the container 101, e.g., C++.

Return messages are received from the container communication framework, deserialized by the stub 109 and given back to the caller. The component frame stub 109 is instantiated once per technology like the component frame 108 during the startup of the container 101.

The component frame skeleton 110 deserializes the messages and calls the component frame service 111 (implementation). The return values are also serialized by the skeleton 110 and sent back as messages to the component frame stub 109. The skeleton 110 is written in a specific technology and instantiated once per technology during the startup of the container 101.

Serialization converts an object/message/data type/file/etc. for transmission across a the container communication framework 113 in binary form. When the resulting series of bytes is received across the container communication framework 113 according to the serialization format, it can be deserialized to a form appropriate to the side of the container communication framework 113, e.g., for a certain component or the common implementation.

The component frame service 111 is the command handler of the lifecycle manager 105 for every component. The component frame service 111 loads, activates, deactivates and unloads the hosted components 102-104. The component frame service 111 hosts all components for a specific technology. The component frame service 111 is written in a specific technology and instantiated once per technology.

The container communication framework 113 is the transport component for serialized messages. The container communication framework 113 decouples technologies, offering technology specific language adapters (LAs) which handle the technology specific conversion of data types. The container communication framework 113 in the container 101 decouples the component 102-104 written in a specific technology from the container core. For inter technology communication the container communication framework 113 may use a shared memory. The data is only copied into a shared memory buffer and copied back from the shared memory into data. There is no change of the data during this process. The specific language adapter is handles the technology specific conversion.

Figure 2:
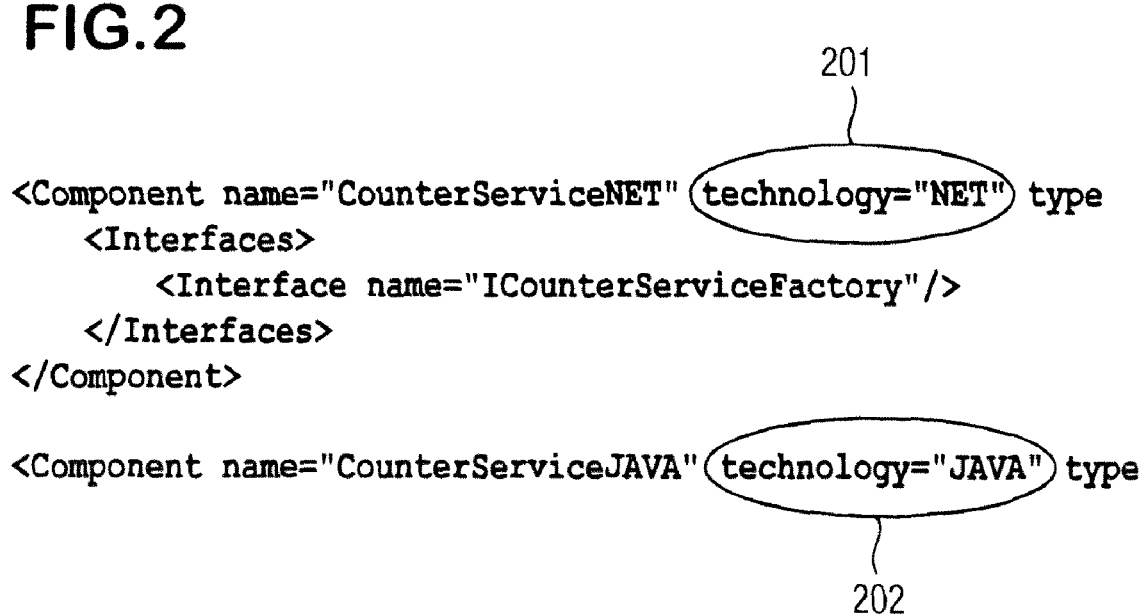
FIG. 2 is an exemplary configuration segment having tags, according to an exemplary embodiment of the present disclosure.

A configuration parser 114 reads the container configuration. The container configuration (FIG. 3, 301) contains the component 102-104 that the container 101 will host. Referring to FIG. 2, each component description contains a tag 201-202 indicating in which technology the component is written.

The container instantiates the lifecycle manager 105, one component frame 108 for each technology, one component frame stub 109 for each technology, the container communication framework 113, one component frame skeleton 110 for each technology and the component frame service 111 for each technology. The container 101 reads the container configuration 301. The container configuration 301 contains information about which component 102-104 will to be hosted by the container 101. The container configuration 301 contains information about what interfaces are provided by such a component 102-104, which interfaces the components use and in which technology the components are written.

For every configured component 102-104 in the container configuration (FIG. 3, 301) a component manager 107 object is created. The component manager 107 knows from the configuration 301 in which technology the hosted component 102-104 is written. To load and start a component 102-104, the component manager 107 initiates a start command to the respective component frame 108. The component frame 108 forwards the call to its associated component frame stub 109. The component frame stub 109 uses the communication framework language adapter 115 to serialize and send the message from a client side to a service side of container communication framework 113. The communication framework language adapter 115 performs the data type conversion in the respective technology on both sides of the container communication framework 113.

In case of the container 101, the message gets written into the C++ Language Adapter 112a (assuming the container is written in C++). On the service side of the container communication framework 113, the component frame skeleton 110 receives the message. In case of a Java component 103, the component frame skeleton—Java 110b receives the message and reads the message data from the Java language adapter 112b of the container communication framework 113. The component frame skeleton 110 deserializes the message and passes the call to the component frame service 111. The component frame service 111 loads and activates the Java component 103 natively.

Figure 3:
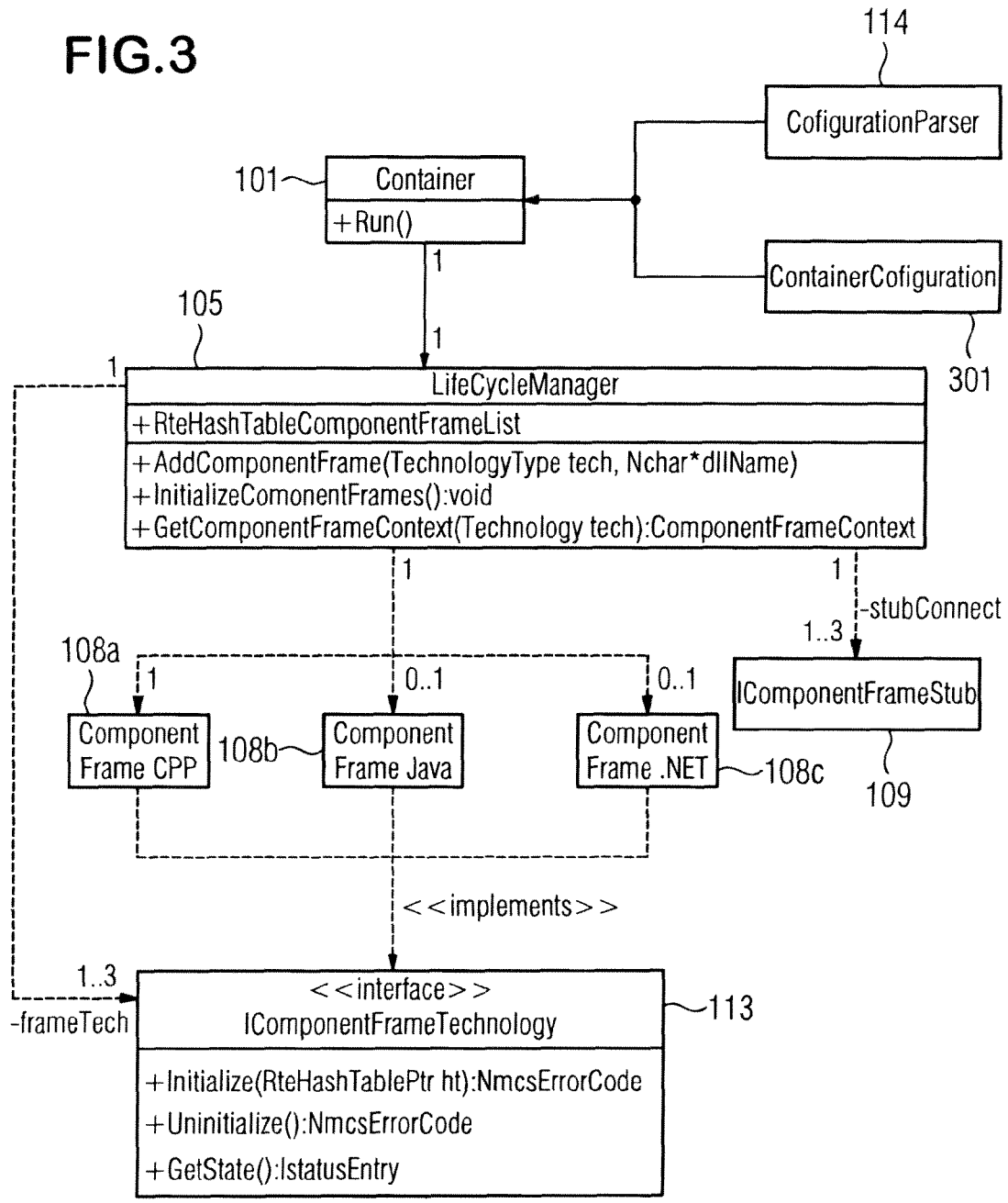
FIG. 3 is an exemplary logical view of a container, according to an exemplary embodiment of the present disclosure.

FIG. 3 is an exemplary logical view of a container 101. The container 101 loads by default a C++ component frame implementing an interface 113 to host and run C++ components. The component frames 108a-c implements the interface 113. The component frames 108a-c is loaded and used by the container 101 for components in the respective technologies. Component frames 108a-c for different technologies may be different DLLs (dynamic-link libraries), which may be implemented in C++. Each component frame 108a-c provides the environment for the respective technology, e.g., the ComponentFrameJava uses JNI (Java Native Interface) to start a JVM and create the java instances, whereas ComponentFrameNet uses reflection. The component frame stub 109 may be implemented as a DLL in C++. For each component frame 108a-c, an instance of the component frame stub 109 is created.

In FIG. 1, each of the environments 115a-c, through its component frame service, component frame skeleton, component frame stub, component frame, the cross environment container communication framework, instantiates objects and manages the loading of the hosted components 102-104 using for example, Jar files, DLL files, Assembly DLL files, etc.

Figure 4:
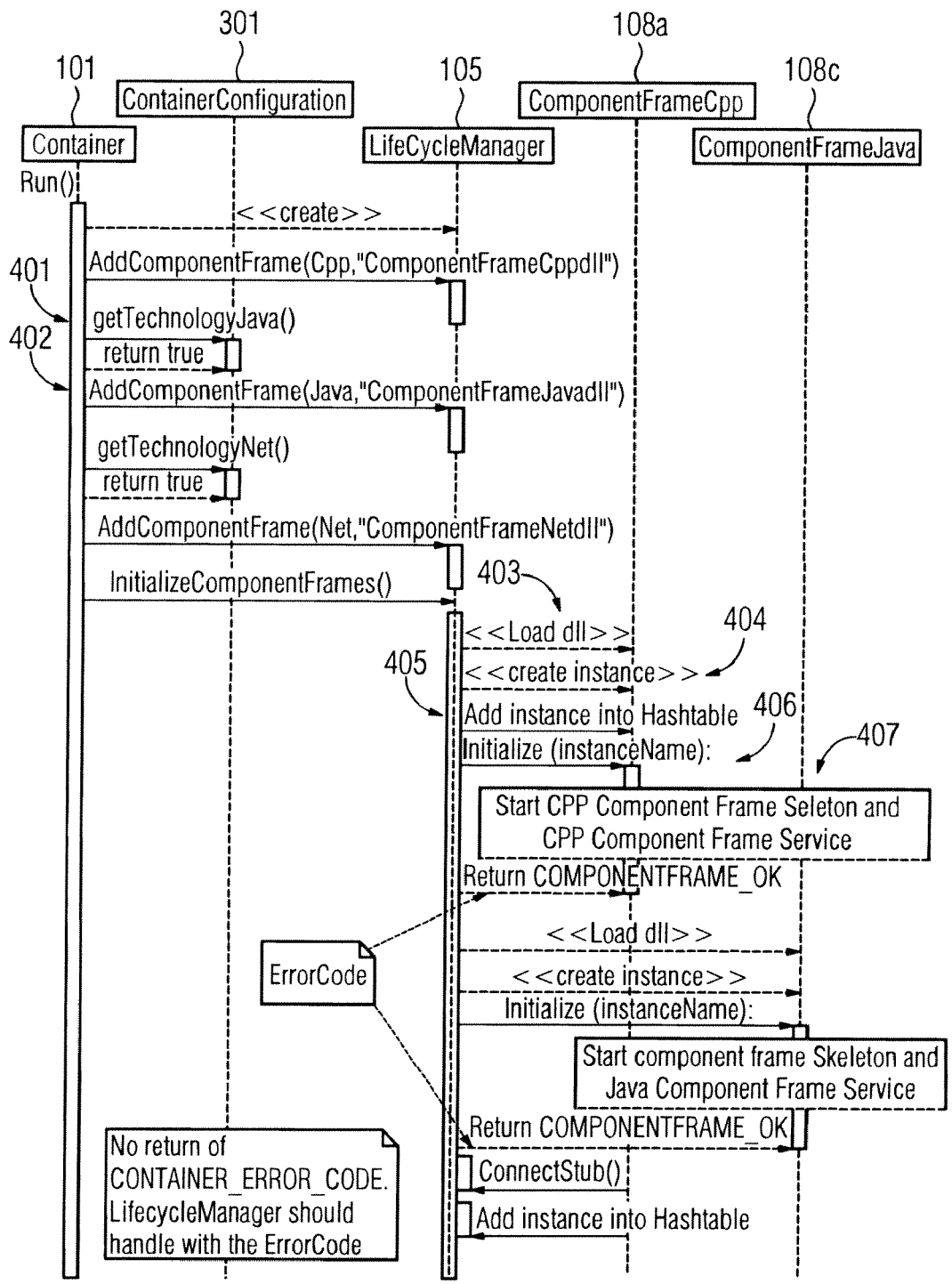
FIG. 4 is an exemplary sequence diagram for container initialization and startup, according to an exemplary embodiment of the present disclosure.

FIG. 4 is a sequence diagram describing how the container 101 configures and initializes life cycle manager 301 and how life cycle manager 301 loads the component frame 108 and stub 109 DLLs and creates instances for respective technologies. Substantially the same sequence for may be used for a Net component frame 108 and stub 109.

During the container startup the container 101 reads the configuration 301 using a getTechnology( ) method e.g., 401 and configures the lifecycle manager 105 accordingly with AddComponentFrame method 402. All enabled component frames 108 are added to the lifecycle manager 105.

The lifecycle manager 105 distinguishes different interface instances 113 with the help of the technology name. The lifecycle manager 105 loads a component DLL 403, creates an instance 404, adds the instance to a set of known instances 405, and initializes the instance 406. The lifecycle manager 105 then starts a component frame skeleton and component frame service (see FIG. 5) 407.

A component frame context stores all component frame 108 relevant information.

```
typedef struct ComponentFrameContext
{
    TechnologyType* technology;
    NChar* dllName;
    IComponentFrameTechnology* iComponentFrameTechnology;
    IComponentFramestub* iComponentFrameStub
}ComponentFrameContext;
```

Note that there is no configuration item needed for component frame CPP, because component frame CPP will be loaded with the container 101. This can be seen in FIG. 4, where loading the component frame C++ uses only the AddComponentFrame method 401 without an accompanying getTechnology( ) method.

The container configuration 301 can be extended to support the container 101 to check whether the corresponding component frame 108 should be loaded or a corresponding stub should be connected.

Referring to FIG. 5, after the activate method of component frame skeleton 110b (Java in this example) is invoked; the container communication framework 113 is registered with its interface. The container service manager 106 can now delegate the component frame stub 109b for Java to let the component frame service 111b load, initialize, configure, and activate the Java components via component frame skeleton 110b.

The container configuration (FIG. 3) can be extended to support corresponding items:
XML configuration file:

```
<ConfigurationItems>
...
<ConfigurationItem name=".NetSupportEnabled" value="true"/>
<ConfigurationItem name="JavaSupportEnabled" value="true"/>
<\ConfigurationItems>
```

The configuration parser 114 reads out the new items and fills in the container configuration 301.

The lifecycle manager 105 is not restricted to the three described technologies (C++, Java, .Net) and can be extended by other technologies. The component frame 108 implements the interface 113, which will be called by the container lifecycle manager 105 to instantiate the component frame 108.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

It is to be understood that embodiments of the present disclosure may be implemented in various forms of hardware, software, firmware, special purpose processors, or a combination thereof. In one embodiment, a software application program is tangibly embodied on a program storage device. The application program may be uploaded to, and executed by, a machine comprising any suitable architecture.

Referring now to FIG. 6, according to an embodiment of the present disclosure, a computer system 601 for enabling software components in a container that are implemented in different technologies, inter alia, a central processing unit (CPU) 602, a memory 603 and an input/output (I/O) interface 604. The computer system 601 is generally coupled through the I/O interface 604 to a display 605 and various input devices 606 such as a mouse and keyboard. The support circuits can include circuits such as cache, power supplies, clock circuits, and a communications bus. The memory 603 can include random access memory (RAM), read only memory (ROM), disk drive, tape drive, etc., or a combination thereof. The present invention can be implemented as a routine 607 that is stored in memory 603 and executed by the CPU 602 to process the signal from the signal source 608. As such, the computer system 601 is a general purpose computer system that becomes a specific purpose computer system when executing the routine 607 of the present disclosure.

The computer platform 601 also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the system is programmed. Given the teachings of the present disclosure provided herein, one of ordinary skill in the related art will be able to contemplate these and similar implementations or configurations of the present disclosure.

Having described embodiments for enabling software components implemented in different technologies in a container, it is noted that modifications and variations can be made by persons skilled in the art in light of the above teachings. It is therefore to be understood that changes may be made in embodiments of the present disclosure that are within the scope and spirit thereof.

What is claimed is:

1. A non-transitory computer readable medium embodying instructions executable by a processor to perform a method for hosting components implemented in different computer readable languages within one process, the method steps comprising:
   instantiating a container within one process;
   creating a hosting environment for each of a plurality of components,
      wherein the hosting environments are objects instantiated within the container and within the one process, and
      wherein the plurality of components are implemented in a respective computer readable language; and
   instantiating a container communication framework object within the container and the one process for processing serialized messages of the components,
      wherein specific language adapters convert data types of the components to a common implementation,
      wherein the messages of the plurality of components are processed within the container, and
      wherein instantiating the container comprises:
         maintaining, by a lifecycle manager, a list of services, service components and shared components of the plurality of components;
         creating a service manager object for each service of the list of services; and
         associating the plurality of components with respective ones of the services.

2. The computer readable medium of claim 1, wherein the method further comprises storing a component instance configuration including resource information for each of the plurality of components.

3. The computer readable medium of claim 1, wherein instantiating the container further comprises:
   providing a generic framework to host the plurality of components; and
   hiding component implementation specifics.

4. The computer readable medium of claim 1, wherein the method further comprises:
   serializing the messages to the plurality of components, wherein an interface is defined for applications and services enabling interaction with the plurality of components; and
   deserializing replies to the messages to a respective hosting environment.

5. The computer readable medium of claim 1, wherein the method further comprises copying data to a shared memory buffer for inter-component communication.

6. A method for creating a device for hosting components implemented in different computer readable languages comprising:
   instantiating a container within one process executing on a processor;
   creating a hosting environment for each computer readable language,
      wherein the hosting environments are objects instantiated within the container, and
      wherein each hosting environment supports at least one component within the one process;
   loading the components by respective hosting environments and instantiating the components within the container; and
   instantiating a container communication framework object within the container for processing serialized messages of the components,
      wherein specific language adapters convert data types of the components to a common implementation within the container,
      wherein the container manages the components through the container communication framework object, and
      wherein instantiating the container comprises:
         maintaining, by a lifecycle manager, a list of services, service components and shared components of a plurality of components, the plurality of components implemented in the respective computer readable language;
         creating a service manager object for each service of the list of services; and
         associating the plurality of components with respective ones of the services.

7. The method of claim 6, further comprising storing a component instance configuration including resource information for each of the plurality of components.

8. The method of claim 6, wherein the container is a generic framework to host the components and hides component implementation specifics between components for inter component communication.

9. The method of claim 6, further comprising:
serializing the messages to the components, wherein an interface is defined for applications and services enabling interaction with the components; and
deserializing replies to the messages to the respective hosting environment.

10. The method of claim 6, further comprising copying data to a shared memory buffer for inter-component communication.

11. A non-transitory computer readable medium embodying instructions executable by a processor to perform a method for hosting components implemented in different computer readable languages within one process, the method steps comprising:
instantiating a container within one process;
creating a hosting environment for each of a plurality of components,
wherein the hosting environments are objects instantiated within the container and within the one process, and
wherein the plurality of components are implemented in a respective computer readable language; and
instantiating a container communication framework object within the container and the one process for processing messages of the components,
wherein language adapters associated with respective hosting environments convert messages of the components to a common implementation for inter-component communication,
wherein the conversion of the messages includes serializing the messages passed to the container communication framework object and deserializing replies to the messages received from the container communication framework object, and
wherein instantiating the container comprises:
maintaining, by a lifecycle manager, a list of services, service components and shared components of a plurality of components;
creating a service manager object for each service of the list of services; and
associating the plurality of components with respective ones of the services.

\* \* \* \* \*